Figure 1:
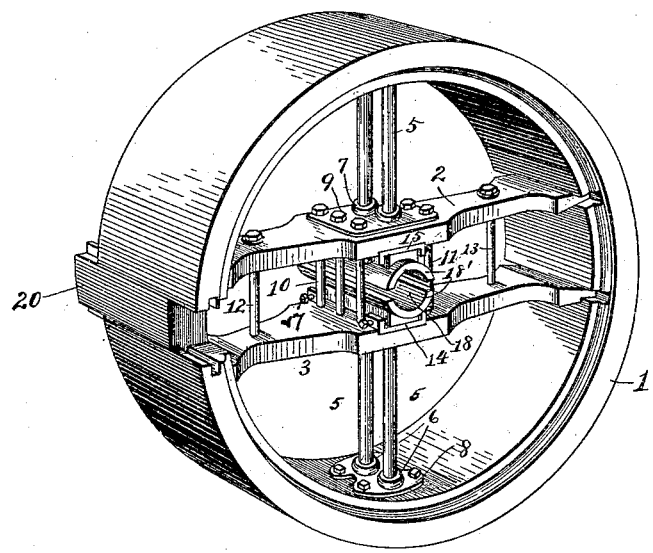

(No Model.) 2 Sheets—Sheet 1.
A. E. PRESTON.
PULLEY.

No. 408,261. Patented Aug. 6, 1889.

WITNESSES: INVENTOR (No Model.) 2 Sheets—Sheet 2.

A. E. PRESTON.
PULLEY.

No. 408,261. Patented Aug. 6, 1889.

WITNESSES:
Percy C Bowen
Arthur L Bryant

INVENTOR
Almon E. Preston
By Edson Bros.
Attorney ated August 6, 1889.

UNITED STATES PATENT OFFICE.

ALMON E. PRESTON, OF BATTLE CREEK, MICHIGAN.

PULLEY.

SPECIFICATION forming part of Letters Patent No. 408,261, dated August 6, 1889.

Application filed May 7, 1889. Serial No. 309,910. (No model.)

*To all whom it may concern:*

Be it known that I, ALMON E. PRESTON, a citizen of the United States, and a resident of Battle Creek, in the county of Calhoun and State of Michigan, have invented certain new and useful Improvements in Pulleys; and I do hereby declare the following to be a full, clear, and exact description of the invention, such as will enable others skilled in the art to which it appertains to make and use the same.

My invention relates to improvements in pulleys of that class known to the art as composite or wood pulleys, in which a wooden rim and metallic centers are employed, so as to avoid the use of wooden parts around and in contact with the shaft, which are liable to shrink, become loose, and throw the pulley off its center.

Among other things, my invention has for its object, first, to provide a pulley with mechanism for adjusting its center with perfect accuracy to the rim of the pulley; second, to secure a firm grip on the shaft by devices which also serve to strengthen the rim against compression and the action of centrifugal force, and to provide a pulley which can be easily and readily applied to or removed from the shaft without disturbing the latter in its bearings or removing other pulleys already on the shaft.

With these objects in view, and such others as appertain to my invention, it consists of a pair of parallel arms or bars arranged within the wooden rim of the pulley and connected at their ends to said rim in such a manner that they can slide or move a limited distance thereon, and two or more radially-adjustable spokes arranged at right angles to said parallel arms and connected at their ends to the arms and rim. Between these parallel arms is arranged a metallic sectional clamping hub or center, which is concaved or shaped to snugly fit the shaft to which the pulley is to be applied, and the sections of this hub or center are connected to the parallel arms substantially in line with the radially-adjustable spokes and in such a manner that they can be adjusted on the parallel arms at right angles to the line of radial adjustment secured by means of said parallel arms and the radial spokes. By the use of this sectional clamping-hub arranged and combined for service in connection with the parallel arms and radial spokes, as contemplated by my invention, I am able to provide a pulley with a center which can be adjusted with perfect accuracy to and concentric with the rim of the pulley, which can be firmly and securely clamped on the shaft, and at the same time the radial spokes and arms serve to strengthen the rim against compression and centrifugal force.

My invention further consists in the peculiar construction and arrangement of parts, as will be more fully hereinafter described, and particularly pointed out in the claims.

To enable others to more readily understand my invention, I will now proceed to describe my preferred embodiment thereof in connection with the accompanying drawings, in which—

Figure 2:
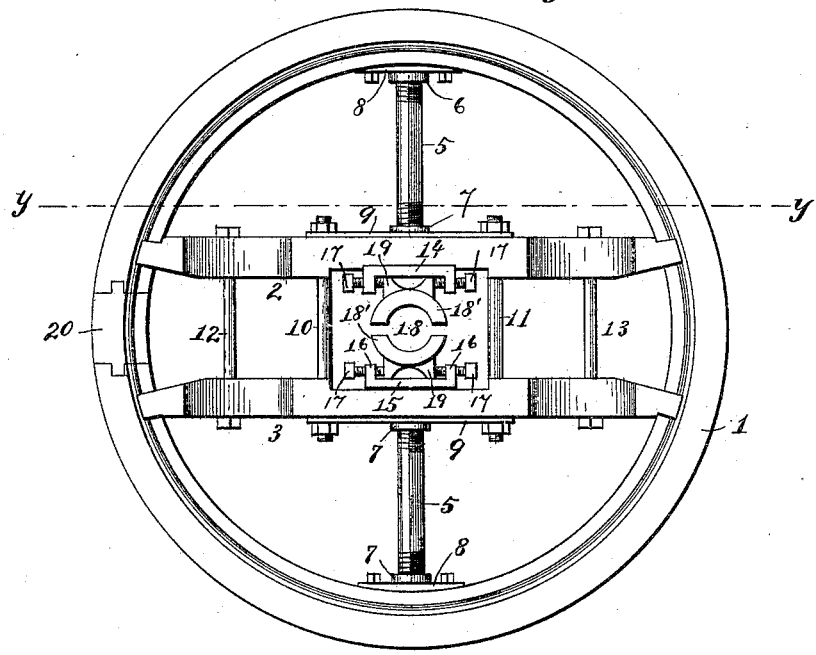
Figure 4:
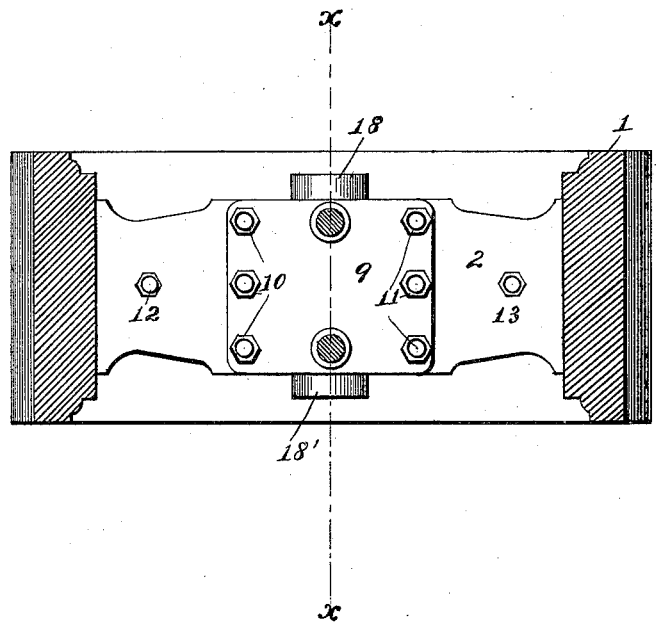
Figure 3:
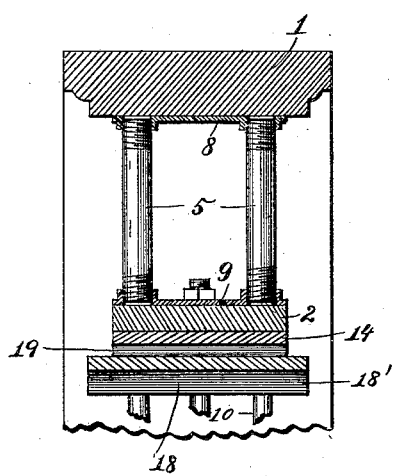
Figure 5:
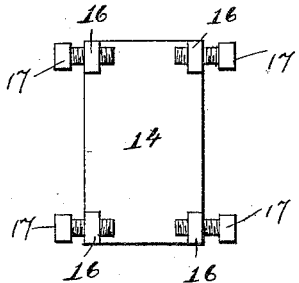

Figure 1 is a perspective view of my improved composite pulley. Fig. 2 is a side elevation thereof. Fig. 3 is a vertical sectional view through one-half of the pulley on the plane indicated by the dotted line $x\ x$ of Fig. 4, and Fig. 4 is a cross-sectional view on the line $y\ y$ of Fig. 2. Fig. 5 is a detail view of one of the stationary plates, in which one of the sections of the hub is adapted to be supported or held.

Like numerals of reference denote corresponding parts in the several figures of the drawings, referring to which—

1 designates the wooden rim of my improved pulley, and 2 3 a pair of parallel arms or bars, preferably made of wood, which extend entirely across the pulley within the rim thereof. These arms or bars are arranged on opposite sides of the center of the rim, and they are connected at both ends to the rim in such a manner that they can slide a limited distance on the rim laterally of each other. The arms may be connected to the rim by means of tongues on the ends of the arms, which fit over a flange on the inner face of the rim 1; but I would have it understood that I do not restrict myself to any particular form of sliding connection between the rim and the arms. Between the rim and each of the parallel arms or bars, at the center of the latter, are arranged one or more radially-adjustable spokes 5, each of which is provided at one end with a right thread and at its other end with a left thread, and the threaded ends of said spoke work in tapped bosses 6 7 of metallic plates 8 9, which are secured, respectively, to the inner face of the rim and the outer face of the arm or bar.

The plates 9 on the parallel arms or bars 2 3 are secured or held in place by means of two series of bolts 10 11, which pass through said plates on opposite sides of the center of the arms, and the arms or bars are also connected near their ends by bolts 12 13, as shown. On the opposing faces of the bars or arms are arranged stationary supporting-plates 14 15, which may be secured by screws or otherwise in a fixed position on the arms or bars, and at their corners or at other suitable points said plates are provided with right-angled lugs or projections 16, in which are formed threaded apertures that receive adjusting screws or taps 17.

18 is the metallic clamping hub or center, which is arranged at the center of the rim between the stationary supporting-plates 14 15. This hub is divided longitudinally into two members or sections 18', which are curved or shaped to fit snugly on the shaft, and on its outer side or face each section or member of the hub is provided with an angular integral flange 19, that is adapted to be fitted between the adjusting-screws which work in one of the supporting-plates 14 or 15, to hold said member of the hub rigidly in place when said screws are turned to bind on the angular flange 19 thereof.

To enable the pulley to be readily fitted on the shaft without disturbing the latter in its bearings or removing other pulleys already on the shaft, I have provided the rim 1 with a removable section 20 at a point between the two parallel arms 2 3, and this removable section of the rim is arranged to fit flush or concentric with the periphery of the rim, and has projecting tongues which fit snugly in suitable grooves or seats formed in the ends of the rim, as will be readily understood.

The operation of my invention is as follows: To apply the pulley to a shaft, the removable section 20 of the rim is removed, the bolt 12 and one series of bolts 10 detached from the arms 2 3, and the adjusting-screws of the supporting-plates turned to release the members of the hub, which can be removed in whole or in part, as may be necessary. The pulley is now manipulated so that the shaft is passed through the opening in the rim formed by removing the section 20 therefrom and between the arms 2 3 until the shaft is arranged between the clamping-plates, after which the sectional hub is adjusted over the shaft and between the supporting-plates and the bolts 10 and 12 and rim-section 20 are replaced. The adjustable spokes 5 are now manipulated to force the arms or bars 2 3 toward each other, and the bolts 12 13 and 10 11 are tightened to draw said arms or bars into such relative positions as to tightly force the sectional hub or center on the shaft and cause it to bind thereon with a firm tight grip. The sectional hub can be adjusted by the screws in the stationary holding-plates 14 15, in a line at right angles to the adjustment secured by the arms or bars and radial spokes, so that by the two adjustments secured by said parts the hub can be moved to a position exactly concentric with the rim.

It will be noted that I provide a composite pulley which has no wooden parts in contact with the metallic shaft, which are liable to shrink and become loose and throw the pulley off its center; that the arms and spokes serve to materially strengthen the rim, so as to render it capable of withstanding the compression and the force of centrifugal action to which it is subjected, and that the pulley can be easily and expeditiously applied to or removed from a shaft.

I attach especial importance to the metallic longitudinally-divided hub or center, which is held in such a manner as to secure an adjustment at right angles to the line of adjustment afforded by the arms and spokes, as I am thereby enabled to adjust the hub with perfect accuracy to the rim or concentric therewith.

I would have it understood that I do not restrict myself to the details of construction and form and proportion of parts herein shown and described as an embodiment of my invention, as I am aware that changes therein can be made without departing from the spirit or sacrificing the advantages of my invention.

Having thus fully described my invention, what I claim as new, and desire to secure by Letters Patent, is—

1. In a pulley, the combination of a rim, the parallel adjustable arms or bars, the spokes intermediate of the arms and rim, and a sectional hub arranged between said arms and adjustable thereon in a line at right angles to the adjustment afforded by the arms and spokes, substantially as and for the purpose described.

2. In a pulley, the combination of a rim, the arms or bars extending across the rim near its center and connected at their ends thereto in such a manner that they can move a limited distance on the same, the adjustable spokes intermediate of the rim and arms, and the sectional hub adjustably connected to the arms and arranged between the same, substantially as and for the purpose described.

3. In a pulley, the combination of a rim, the adjustable arms or bars arranged across the rim, the bolts connecting said bars, the radial spokes intermediate of the rim and the arms, and a sectional hub arranged between the arms or bars substantially in line with the radial spokes and adjustable on said arms longitudinally thereof, substantially as and for the purpose described.

4. In a pulley, the combination, with the arms or bars, of the stationary supporting-plates, the divided hub having one of its members fitted in each of said plates, and the adjusting-screws working in the plates and adapted to bear upon the member of the hub fitted therein, substantially as and for the purpose described.

5. In a pulley, the combination of a rim, the parallel arms or bars, the plates secured to the rim at diametrically-opposite points thereof and having the threaded bosses, the plates arranged on the outer faces of the arms and each having a threaded boss, the radial threaded spokes tapped in the bosses of said plates on the rim and arms, the bolts passing through the arms and plates thereon, and a hub supported between said arms or bars, substantially as and for the purpose described.

6. In a pulley, the combination of a rim, the adjustable arms or bars, the radial spokes intermediate of the arms and rim, the bolts connecting the arms to each other, the stationary plates secured to the arms between the opposing faces thereof, the sectional hub having its members provided with flanges which are fitted in said plates, and regulating-screws fitted in the supporting-plates and adapted to bind on the flanges of the hub-sections, all arranged and combined for service substantially as herein shown and described.

In testimony whereof I affix my signature in presence of two witnesses.

ALMON E. PRESTON.

Witnesses:
GEO. F. NEALE,
MICHAEL NEALE.